June 8, 1926. F. SPIVEY 1,588,062

APPARATUS FOR DISTRIBUTING OIL OR OTHER LIQUIDS UPON FIBERS AND THE LIKE

Filed Dec. 28, 1925

INVENTOR:
Fred Spivey
by Monroe E. Miller
Attorney.

Patented June 8, 1926.

1,588,062

UNITED STATES PATENT OFFICE.

FRED SPIVEY, OF HECKMONDWIKE, ENGLAND, ASSIGNOR OF ONE-HALF TO HAROLD PARKIN, OF LIVERSEDGE, ENGLAND.

APPARATUS FOR DISTRIBUTING OIL OR OTHER LIQUIDS UPON FIBERS AND THE LIKE.

Application filed December 28, 1925, Serial No. 77,954, and in Great Britain December 19, 1924.

This invention relates to machinery or apparatus for distributing oil or other liquids upon fibers or the like as they are caused to travel past the machine and the object of the invention is the provision of a novel combination and arrangement of component elements for taking liquid from a trough or receptacle and spraying it in finely diffused or distributed form over the material to be treated.

In the accompanying drawings:—

Figure 1:
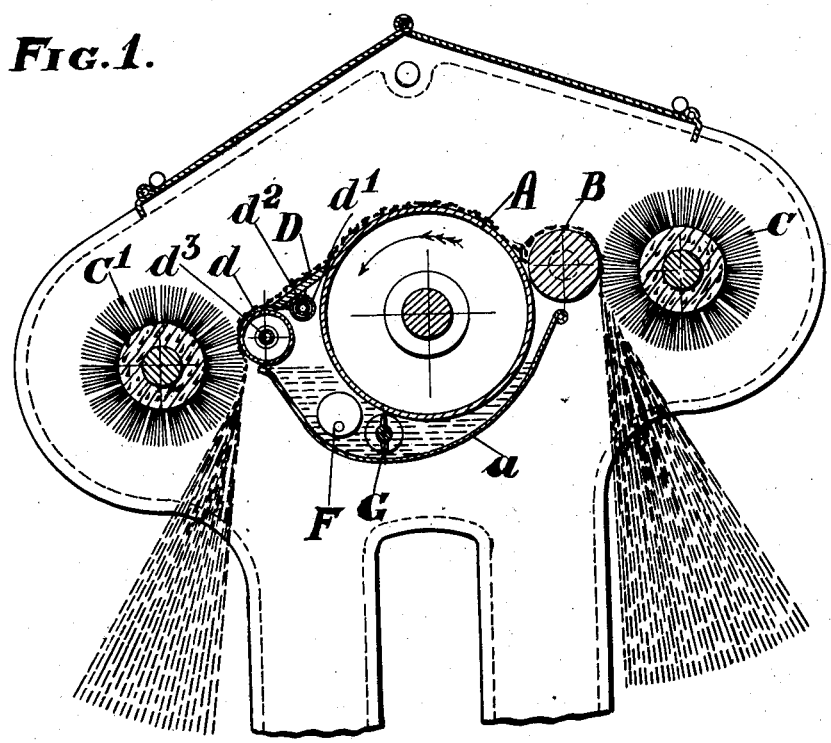
Figure 2:
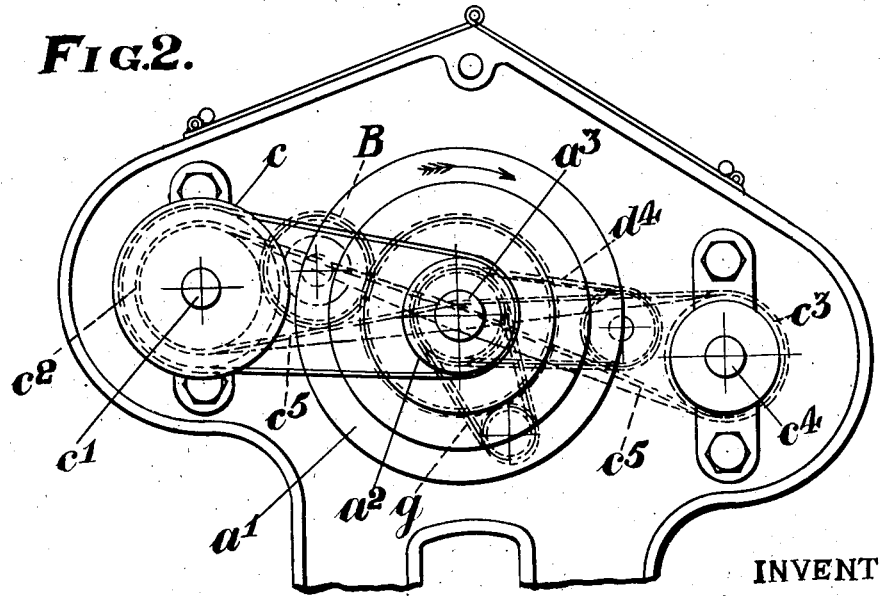

Fig. 1 is a section taken through a machine constructed in accordance with this invention, and Fig. 2 is an end elevation of part of the machine showing the drive.

A indicates a liquid collecting roller that is rotatably mounted in a trough $a$ between two liquid stripping devices one of which comprises a stripping roller B rotating in contact with or in close proximity to the collecting roller A and also in contact with a rapidly revolving distributing brush C. The other stripping device comprises a pivotally mounted plate D interposed between the roller A and a roller $d$. The liquid that is collected by the plate D passes therefrom on to the roller $d$ in the form of a film which is sprayed from the roller $d$ by a rapidly revolving distributing brush $C^1$. The plate D is fixed on a pivotally mounted tube $d^1$ through which passes a tube $d^2$ to which steam can be supplied from any convenient source. The roller $d$ is also made in the form of a hollow cylinder and heated by a steam pipe $d^3$ which passes through it. The liquid in the trough $a$ which supplies the roller A is provided with an electric or other suitable heater F by means of which the liquid can be maintained in the most efficient condition for spraying purposes. An agitator G is also rotatably mounted in the trough for keeping the liquid therein in a state of agitation. The roller A is driven by a cone pulley $a^1$ and power may be transmitted from a pulley $a^2$ on the shaft $a^3$ to a pulley $c$ on the shaft $c^1$, a pulley $c^2$ on such shaft at the other end of the machine transmitting power to a pulley $c^3$ on the shaft $c^4$ of the brush C by a crossed belt $c^5$. The agitator G may be driven by a belt or chain $g$ from a wheel on the shaft $a^3$, and the roller $d^3$ may in like manner be driven by a belt or chain $d^4$ from another wheel on the shaft $a^3$. The spraying brushes can be arranged in any suitable position in relation to the rollers B and $d$ to cause the spray to be thrown in any required direction to the fibers or other materials which are moved past the machine.

What I claim as my invention and desire to secure by Letters Patent in the United States is:—

1. In a liquid spraying machine, the combination of a liquid trough, a liquid collecting roller rotatably mounted therein, a second roller rotatably mounted at one side of the collecting roller, a plate pivotally mounted between said rollers for stripping a film of liquid from the collecting roller and delivering the liquid to the second roller, and a distributing brush rotatable at a high speed in contact with said second roller.

2. In a liquid spraying machine, the combination of a liquid trough, a liquid collecting roller rotatably mounted therein, a second roller mounted at one side of the collecting roller, a rotatably mounted tube between said rollers, a plate mounted on said tube and cooperable with the rollers for stripping a film of liquid from the collecting roller and delivering same to the second roller, a distributing brush rotatable at a high speed in contact with a second roller, and a heating medium in said tube.

3. In a liquid spraying machine, the combination of a liquid trough, a liquid collecting roller rotatably mounted therein, a hollow roller mounted for rotation at one side of the collecting roller, a tube located between said rollers, a stripping plate mounted on said tube and cooperable with said rollers for stripping a film of liquid from the collecting roller and delivering the liquid to the hollow roller, a distributing brush rotatable at a high speed in contact with the hollow roller, and a heating medium in said hollow roller and tube.

In testimony whereof I affix my signature.

FRED SPIVEY.